US 9,217,389 B1

(12) United States Patent
Lee et al.

(10) Patent No.: US 9,217,389 B1
(45) Date of Patent: Dec. 22, 2015

(54) ROCKET TURBOPUMP VALVES AND ASSOCIATED SYSTEMS AND METHODS

(75) Inventors: Gerald A. Lee, Newcastle, WA (US); Michael C. Krene, Mercer Island, WA (US)

(73) Assignee: Blue Origin, LLC, Kent, WA (US)

( * ) Notice: Subject to any disclaimer, the term of this patent is extended or adjusted under 35 U.S.C. 154(b) by 1018 days.

(21) Appl. No.: 13/294,061

(22) Filed: Nov. 10, 2011

(51) Int. Cl.
*F02K 1/11* (2006.01)
*F16K 3/03* (2006.01)
*F16K 3/04* (2006.01)

(52) U.S. Cl.
CPC .... *F02K 1/11* (2013.01); *F16K 3/03* (2013.01)

(58) Field of Classification Search
CPC ............... F02C 5/12; F02C 5/00; F02K 1/11; F16K 3/03; F16K 3/04; F16K 31/53; F16K 31/535
USPC ............... 60/200.1, 249, 39.39, 39.79–39.81; 251/212, 248
See application file for complete search history.

(56) References Cited

U.S. PATENT DOCUMENTS

| | | | |
|---|---|---|---|
| 18,058 A | 8/1857 | Raymond et al. | |
| 1,595,300 A | 8/1926 | Halloran | |
| 2,037,663 A | 4/1936 | Lalor | |
| 2,043,337 A | 6/1936 | Smith | |
| 2,307,273 A | 1/1943 | Hughes | |
| 2,870,599 A | 6/1959 | Long et al. | |
| 3,159,179 A * | 12/1964 | De Lain | 137/545 |
| 3,329,396 A | 7/1967 | Heaton | |
| 3,438,316 A | 4/1969 | Rodier | |
| 3,787,022 A * | 1/1974 | Wilcox | 251/212 |
| 3,828,551 A | 8/1974 | Schmidt | |
| 3,912,172 A | 10/1975 | Bolner | |
| 4,094,492 A | 6/1978 | Beeman et al. | |
| 4,184,238 A | 1/1980 | Carey | |
| 4,513,948 A | 4/1985 | Konig | |
| 4,796,839 A | 1/1989 | Davis | |
| 4,811,182 A | 3/1989 | Solomon | |
| 4,964,340 A | 10/1990 | Daniels et al. | |
| 5,033,519 A | 7/1991 | Puffer et al. | |

(Continued)

FOREIGN PATENT DOCUMENTS

DE 10058339 A1 6/2002
EP 0741655 A1 11/1996

(Continued)

OTHER PUBLICATIONS

Aerospace America, "The 787 and the A350 Teasing out the Facts," Publication of The American Institute of Aeronautics and Astronautics, Jun. 2009, 3 pages.

(Continued)

*Primary Examiner* — Andrew Nguyen
(74) *Attorney, Agent, or Firm* — Perkins Coie LLP

(57) ABSTRACT

Rocket turbopump valves and associated system and methods. A valve in accordance with at least one embodiment includes a housing having a valve aperture, and first and second valve elements positioned in the housing and movable relative to the valve aperture between a closed position and an open position. Each valve element can be pivotably connected to the housing toward a first end and supported by the other valve element toward a second end. A drive mechanism is coupled to the first and second valve elements to pivot the valve elements toward and away from their open and closed positions.

16 Claims, 10 Drawing Sheets

(56) References Cited

U.S. PATENT DOCUMENTS

| | | |
|---|---|---|
| 5,101,662 A | 4/1992 | Fisher |
| 5,129,602 A | 7/1992 | Leonard |
| 5,568,901 A | 10/1996 | Stiennon |
| 5,667,167 A | 9/1997 | Kistler |
| 5,678,784 A | 10/1997 | Marshall, Jr. et al. |
| 5,765,361 A | 6/1998 | Jones et al. |
| 5,806,725 A | 9/1998 | Bennett |
| 5,927,653 A | 7/1999 | Mueller et al. |
| 6,039,325 A | 3/2000 | Steinetz et al. |
| 6,402,091 B1 | 6/2002 | Hansen |
| 6,457,306 B1 | 10/2002 | Abel et al. |
| 6,513,760 B1 | 2/2003 | Mueller et al. |
| 6,668,543 B2 | 12/2003 | Linner |
| 6,945,498 B2 | 9/2005 | Mueller et al. |
| 7,000,402 B2 * | 2/2006 | Benians .................. 60/776 |
| 7,389,636 B2 | 6/2008 | Fowler et al. |
| 8,047,472 B1 | 11/2011 | Brand et al. |
| 2006/0049316 A1 | 3/2006 | Antonenko et al. |
| 2007/0012820 A1 | 1/2007 | Buehler |
| 2009/0302252 A1 | 12/2009 | Cheung |
| 2010/0326045 A1 | 12/2010 | Lai |
| 2011/0302905 A1 | 12/2011 | Weinberg et al. |

FOREIGN PATENT DOCUMENTS

| | | |
|---|---|---|
| EP | 1340316 A1 | 9/2003 |
| EP | 2308636 B1 | 5/2012 |

OTHER PUBLICATIONS

Hulka et al., Modification and Verification Testing of a Russian NK-33 Rocket Engine for Reusable and Restartable Applications, AIAA 98/3361, 1998, 26 pages.

* cited by examiner

ROCKET TURBOPUMP VALVES AND ASSOCIATED SYSTEMS AND METHODS

TECHNICAL FIELD

The present technology relates to rocket turbopump valves and associated systems and methods.

BACKGROUND

Rockets have been used for many years to launch human and non-human payloads into orbit. Such rockets delivered the first humans to space and to the moon, and have launched countless satellites into the Earth's orbit and beyond. Such rockets are used to propel unmanned space probes and more recently to deliver structures, supplies, and personnel to the orbiting International Space Station.

One characteristic of many existing rocket engines is the limited ability to control the thrust produced by such engines. While this is not typically an issue for single-purpose rocket stages that propel a payload outside the Earth's atmosphere, such features can limit the functionality of rocket engines that provide more versatile functions. Accordingly, there remains a need for rocket engines having an increased level of controllability.

DETAILED DESCRIPTION

The present disclosure is directed generally to control valves for rocket engines, and associated systems and methods. In particular embodiments, the control valve can be connected to a turbopump to control the flow of fuel and/or oxidant to the rocket engines and can include an arrangement of interleaved "eyelid" shaped elements that can withstand high temperature and/or high pressure environments. Several details describing structures and processes that are well-known and often associated with control valves are not set forth in the following description to avoid obscuring other aspects of the disclosure. Moreover, although the following disclosure sets forth several embodiments, several other embodiments can have different configurations, arrangements, and/or components than those described in this section. In particular, other embodiments may have additional elements, and/or may lack one or more of the elements described below with reference to FIGS. 1-7.

Figure 1:
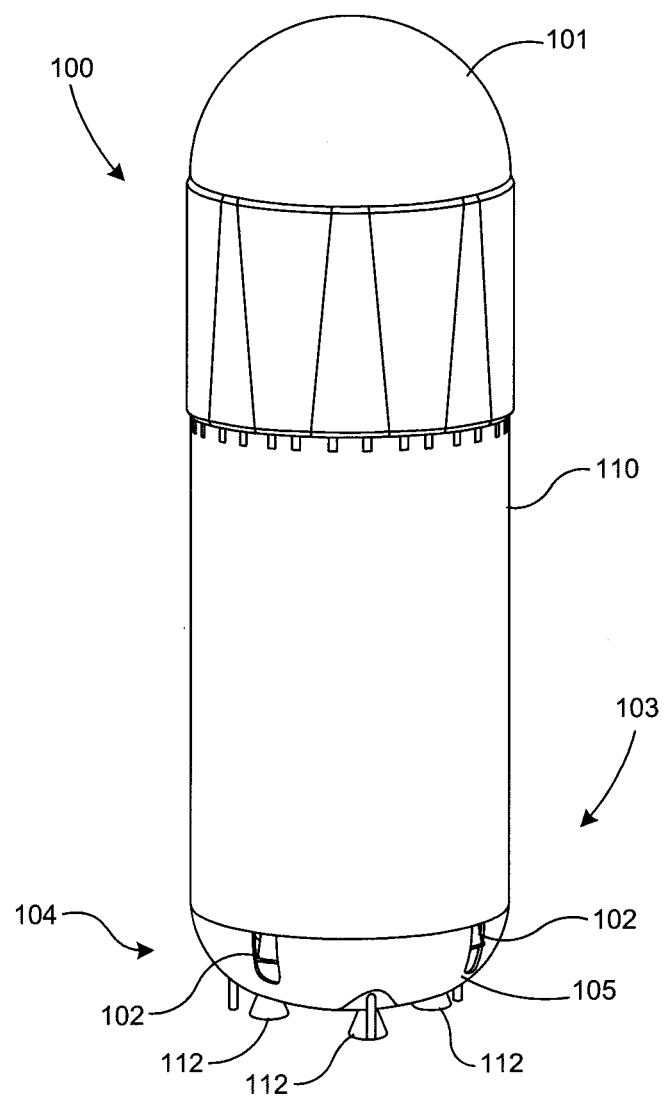
FIG. 1 is a partially schematic, side elevation view of a representative vehicle having a propulsion system with turbopump valves configured in accordance with an embodiment of the disclosure.

FIG. 1 is a top isometric illustration of a vehicle 100 configured in accordance with an embodiment of the disclosure. The vehicle 100 can be a rocket (e.g., an orbital or suborbital vehicle) that includes a propulsion module 110 carrying a payload module 101. The propulsion module 110 can include one or more engines having corresponding engine exhaust nozzles 112 positioned at an aft portion 103 of the vehicle 100. The vehicle 100 can include landing gear 102 positioned to allow the vehicle 100 to land in a tail-down orientation. Fins (not shown in FIG. 1) toward the aft portion 103 of the vehicle 100 can act as stabilizers and/or control surfaces during ascent, and can also act as stabilizers and/or control surfaces during descent.

In a particular embodiment, the payload module 101 can be configured to carry cargo and/or crew. In an embodiment shown in FIG. 1, the payload module 101 can have a hemispherical shape and in other embodiments, the payload module 101 can have other shapes.

In a particular embodiment shown in FIG. 1, the vehicle 100 includes five engines, each having a corresponding engine exhaust nozzle 112 that projects outwardly through a heat shield 105 at a lower surface 104 of the vehicle 100. The heat shield 105 protects the vehicle 100 from high temperatures associated with engine exhaust gas products encountered during engine operation, and/or aerodynamic friction encountered during high speed descent. The engines are used during the boost phase to propel the vehicle 100 upwardly. The engines can also provide thrust vectoring to steer the vehicle 100 during one or more phases of a mission (e.g., during the boost phase and/or the landing phase), alone or in combination with other control systems (e.g., the fins). Accordingly, the exhaust nozzles 112 can gimbal so as to direct thrust in a manner that stabilizes and/or steers the vehicle 100. During a representative mission, the engines and/or the fins can be used to control and steer the vehicle directly back to the site from which it was launched. In other embodiments, the vehicle 100 can be steered to other sites. In any of these embodiments, as the vehicle 100 approaches the landing site, the engines can be used to slow the vehicle 100 down and to steer/stabilize the vehicle 100. The landing gear 102 are then deployed for final touchdown.

Figure 2:
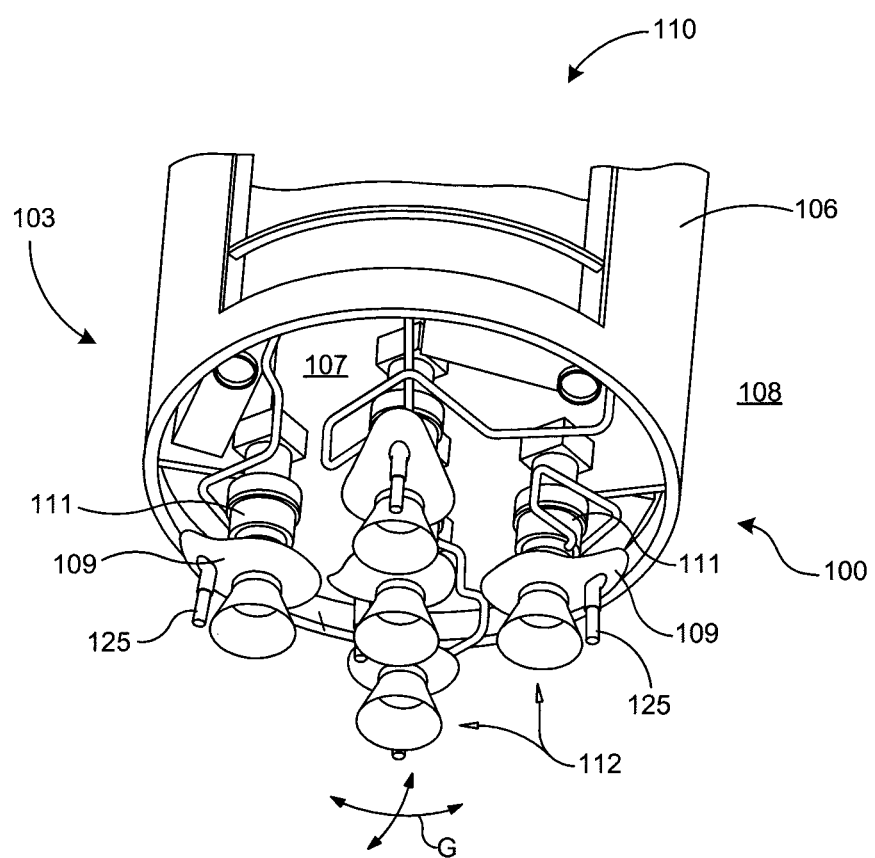
FIG. 2 is a partially schematic, bottom isometric illustration of a portion of the vehicle shown in FIG. 1.

FIG. 2 is a bottom isometric illustration of the aft or lower portion 103 of the propulsion module 110 described above with reference to FIG. 1. For purposes of clarity, the heat shield 105 described above with reference to FIG. 1 has been removed in the illustration shown in FIG. 2. The propulsion module 110 includes a casing 106 that separates an external region 108 outside the vehicle 100 from an internal region 107 within the vehicle 100. The propulsion module 110 contains one or more engines 111 (five are shown in FIG. 2), each having a corresponding exhaust nozzle 112. In a particular aspect of an embodiment shown in FIG. 2, each engine 111 also includes one or more turbopumps that provide fuel and/or oxidant for combustion. Exhaust products from the turbopumps are directed through turbopump exhausts 125 positioned alongside the nozzles 112. Each of the engines 111 can gimbal in multiple directions (as indicated by arrows G) about a corresponding pivot point so as to provide for thrust vectoring. Accordingly, each engine 111 can include a sealing surface 109 (e.g., a rigid sealing surface) having a spherical or otherwise curved shape that is used to maintain a seal or partial seal between the internal region 107 and the external region 108 even as the engines 111 gimbal relative to the casing 106.

Figure 3:
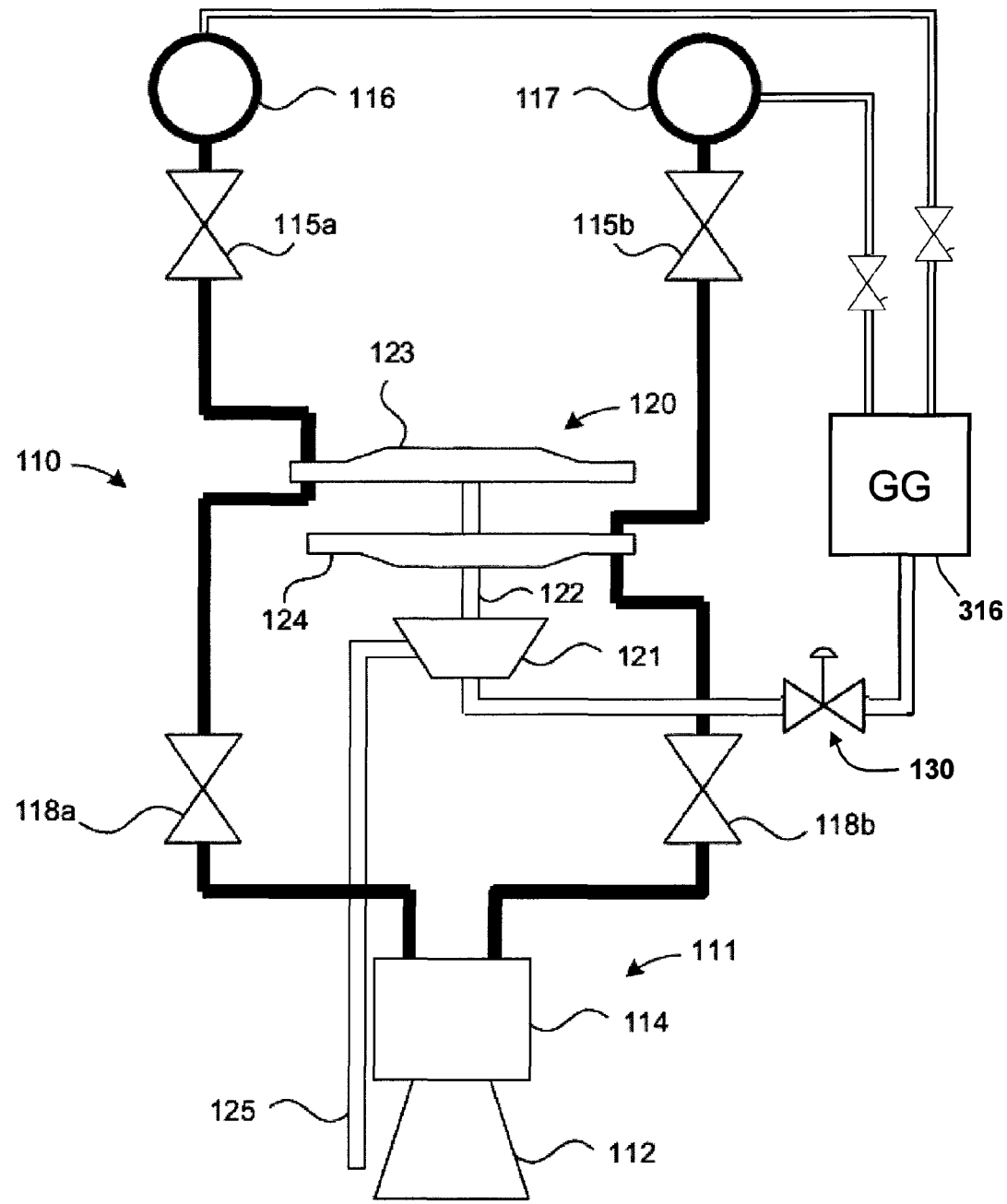
FIG. 3 is a schematic illustration of portions of a propulsion module that includes a turbopump control valve positioned in accordance with an embodiment of the disclosure.

FIG. 3 is a schematic illustration of a portion of the propulsion module 110, including a representative one of the engines 111 shown in FIG. 2. The engine 111 receives fuel (e.g., hydrogen peroxide, cryogenic fuels, such as hydrogen, or petroleum-based fuels, such as RP1 or other kerosenes) from a fuel tank 116. The fuel passes through a fuel isolation valve 115a and is pressurized by a fuel pump 123. The fuel then passes through a main fuel valve 118a into a combustion chamber 114 where it is combined with an oxidizer, combusted, and ejected through the nozzle 112. The oxidizer is supplied from an oxidizer tank 117 and passes through a corresponding oxidizer isolation valve 115b, an oxidizer pump 124, and a main oxidizer valve 118b into the combustion chamber 114.

The fuel pump 123 and the oxidizer pump 124 can include turbodriven components, and can accordingly form portions of a turbopump 120. The turbopump 120 receives hot gases from a combustion source, such as a gas generator 316. The gas generator 316 can receive fuel and oxidizer from the fuel tank 116 and the oxidizer tank 117, respectively, for combustion. Hot gases from the gas generator 316 pass through a turbine 121 and drive a shaft 122 connected to the oxidizer pump 124 and the fuel pump 123. After passing through the turbine 121, the combustion gases are directed overboard via the turbopump exhaust 125. In other embodiments, the turbopump can receive energy from other heat sources.

The propulsion module 110 can further include a control valve 130 positioned in the hot gas line between the gas generator 316 and the turbine 121. One function of the control valve 130 is to control the thrust delivered by the engine 111 by controlling the turbopump 120 that provides fuel and oxidizer to the engine 111. In many embodiments, it is advantageous for the control valve 130 to operate rapidly to shut down the turbopump 120 (and therefore the flow of fuel and oxidizer to the combustion chamber 114) e.g., in the event of an emergency. Another function of the control valve 130 is to reopen after shutoff. For example, the control valve can terminate the flow of fuel and oxidizer after the vehicle boost phase, and restart the engine 111 during the terminal portion of the landing operation to control the tail-down vehicle rate of decent. Still another function of the control valve 130 is to meter (in addition to merely allowing or preventing) the flow of hot gases to the turbine 121, and therefore the rate at which the turbopump 120 provides fuel and oxidizer to the engine 111. By metering or fine tuning the output of the turbine 121, and therefore the pumping rate of the turbopump 120, the system can finely tune the amount of thrust produced by the engine 111, which can be particularly important during landing. Features of a representative control valve 130 that provides the foregoing functions are described in further detail below with reference to FIGS. 4A-7.

Figure 4A:
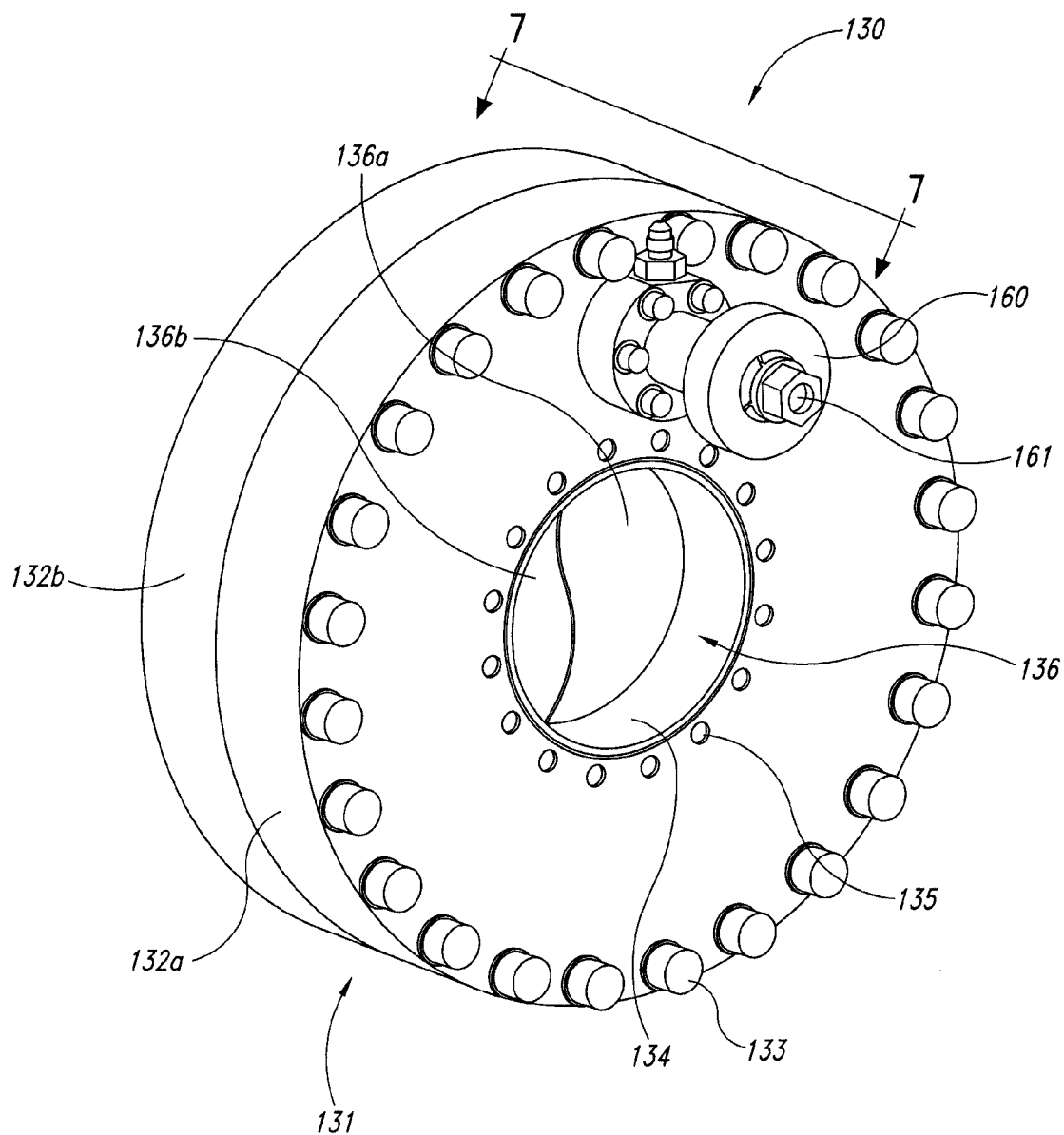
FIG. 4A is a partially schematic, isometric illustration of a control valve configured in accordance with an embodiment of the disclosure.

FIG. 4A is an isometric illustration of an embodiment of the valve 130 described above with reference to FIG. 3. The valve 130 includes a housing 131, which in turn includes a first housing unit 132a connected to a second housing unit 132b via bolts 133 or other suitable connection elements. The housing 131 includes a valve aperture 134 that extends through both the first and second housing units 132a, 132b. Each of the housing units 132a, 132b includes conduit connection features 135 (e.g., threaded bolt holes) that facilitate connecting conduits to opposite faces of the housing 131. Valve "eyelids," leaves or other elements or members (referred to generally as lids 136) are positioned in the valve aperture 134 to control the flow of fluid through the valve aperture 134. In a particular embodiment, the valve lids 136 include a first lid 136a and a second lid 136b, both of which are shown in a closed position in FIG. 4A. In this position, the valve lids form a "yin/yang" shape, which is also shown in later Figures. The valve lids 136 are driven by an actuator (e.g., an electric motor, a pneumatic actuator or a hydraulic actuator, not shown in FIG. 4A) that is coupled to the valve lids 136 by a drive shaft 161 contained in a drive housing 160.

Figure 4B:
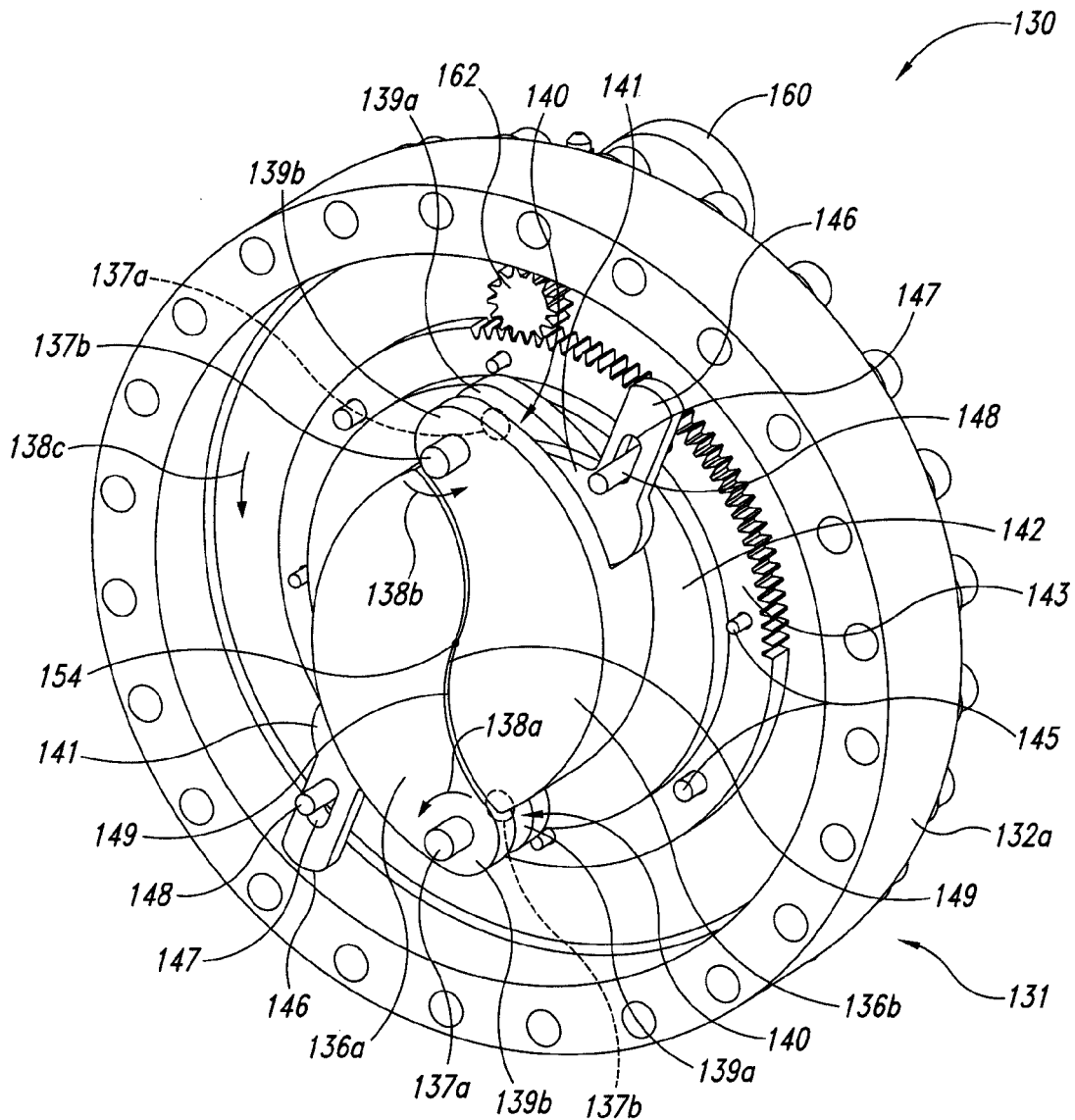
FIG. 4B is a partially schematic, isometric illustration of selected elements of the control valve shown in FIG. 4A.

FIG. 4B is an isometric illustration of the valve 130, with the second housing unit 132b removed to illustrate internal features of the valve 130. Each of the lids 136a, 136b includes a pair of flanges 139 (shown as first flanges 139a and second flanges 139b) positioned toward one end, and a protrusion 141 positioned toward the opposite end. The flanges 139 are separated by a gap 140 so that the protrusion 141 of the first lid 136a is received in the gap 140 of the second lid 136b, and the protrusion 141 of the second lid 136b is received in the gap 140 of the first lid 136a. Each of the flanges 139 is pivotably connected to the housing 131 to allow the first lid 136a to rotate outwardly as shown by arrow 138a, and to allow the second lid 136b to rotate outwardly as indicated by arrow 138b. Each of the flanges 139a, 139b of the second lid 136b are pivotably connected to a corresponding one of the housing units 132a, 132b. Accordingly, the first flange 139a is connected via a first pivot pin 137a to a pedestal 142 carried by the first housing unit 132a. The second flange 139b is connected via a second, coaxial pivot pin 137b to a corresponding pedestal carried by the second housing unit 132b (not shown in FIG. 4B). The pivot pins 137a, 137b for each of the flanges 139a, 139b do not extend into the gap 140 so as not to inhibit the motion of the protrusion 141 of the first lid 136a within the gap 140. The first lid 136a includes a similar arrangement.

Each of the protrusions 141 includes a tab 146 that extends radially outwardly. The tab 146 includes a pin slot 147 that receives a drive pin 148. The drive pin 148 is connected to a ring gear 143 via an intermediate drive ring that is described in further detail below with reference to FIGS. 5A-7. The drive ring is attached to the ring gear 143 via mounting pins/screws and clocking pins 145. The ring gear 143 is driven by a pinion 162 carried by the drive shaft 161 (FIG. 4A) in the drive housing 160. In a particular embodiment, the pinion 162 has an 8:1 gear ratio with the ring gear 143 to allow a small electric motor to drive the lids 136 with a fine degree of resolution. In other embodiments, the pinion 162 and ring gear 143 can have other gear ratios, and/or other arrangements.

During operation, an electric motor or other actuator drives the pinion 162 which in turn rotates the ring gear 143. As the ring gear 143 and associated drive ring (FIGS. 5A-7) rotate, they cause the drive pins 148 to orbit about a central axis 154 as indicated by arrow 138c. The drive pins 148 impart tangential/circumferential forces to the tabs 146 of each lid 136, causing the lids 136 to rotate about the corresponding pivot pins 137a, 137b as indicated by arrows 138a, 138b. Each of the lids 136a, 136b has a close stop surface 149 that mates or at least approximately mates with the corresponding close stop surface 149 of the other lid when the valve 130 closes. In the illustrated embodiment, the close stop surfaces 149 have complimentary curved shapes, such as complementary S shapes. In other embodiments, the close stop surfaces 149 can have other shapes. When the valve 130 is in the closed position, as shown in FIG. 4B, the close stop surfaces 149 mate or approximately mate to prevent or significantly restrict the flow of hot gases through the valve 130. In a particular embodiment, the valve 130 blocks 95% or more of the flow when in the closed position. In other embodiments, the flow blockage can have different values, depending on the particular application, and/or other factors.

Figure 5A:
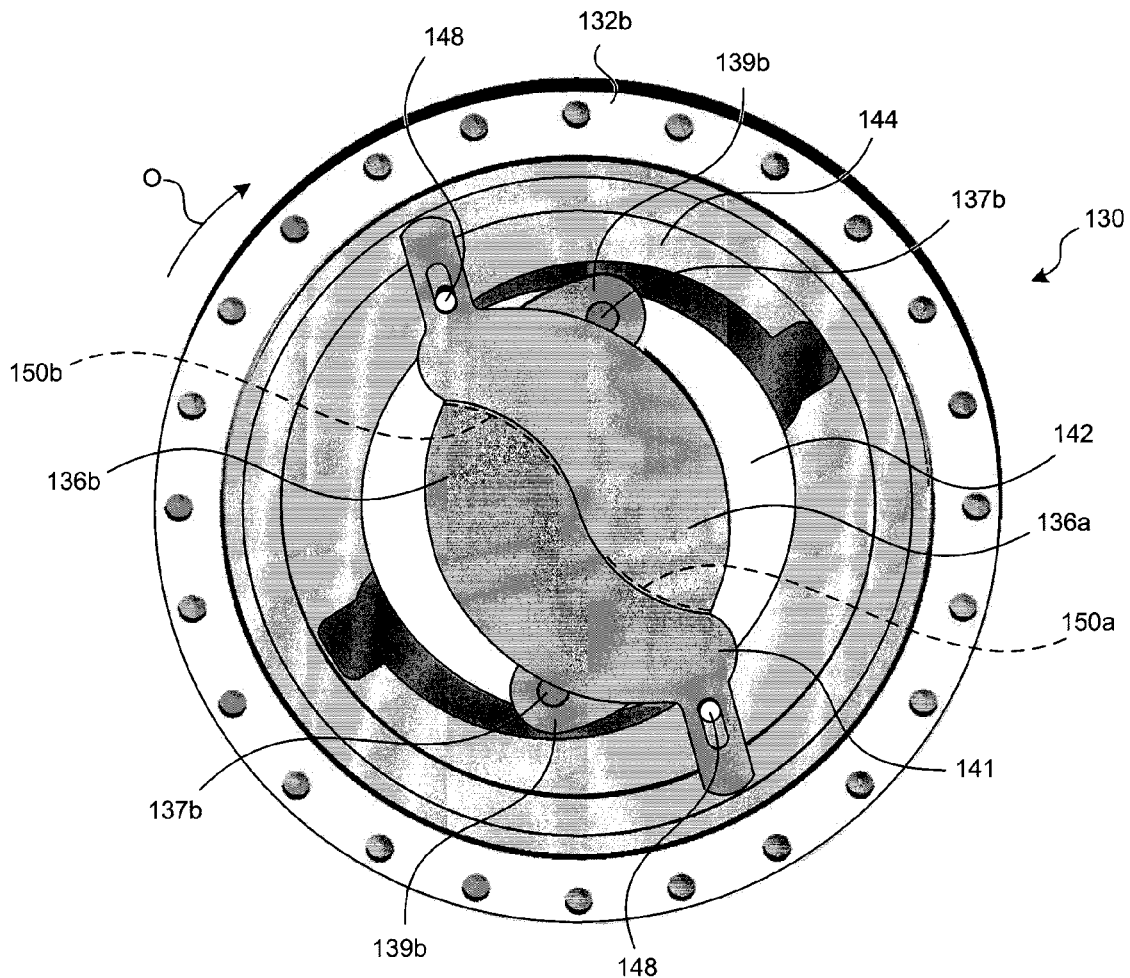
FIGS. 5A and 5B illustrate a second housing unit and first housing unit, respectively, of an embodiment of the control valve shown in a closed position.

FIG. 5A illustrates the second housing unit 132b with the valve 130 in a closed position. For purposes of illustration, the first flanges of each of the lids 136a, 136b have been removed as indicated by dashed lines 150a, 150b in FIG. 5A. Accordingly, only the second flanges 139b are visible in FIG. 5A. As shown in FIG. 5A, the second housing unit 132b includes a pedestal 142 that carries the second pivot pins 137b connected to the second flanges 139b of each of the lids 136a, 136b. The drive pins 148 of each of the lids 136a, 136b are received in a drive ring 144 which is in turn attached to the ring gear 143 described above with reference to FIG. 4B. Accordingly, the drive ring 144 is positioned between the ring gear 143 and the lids 136a, 136b along the central axis 154. The drive ring 144 transmits the rotary motion of the ring gear 143 to the drive pins 148. In a particular embodiment shown in FIG. 5A, the ring gear 143 and the drive ring 144 are initially formed separately and are then connected, for ease of manufacturing. In other embodiments, these structures can be manufactured as a single unitary component. To open the valve 130, the ring gear 143 drives the drive ring 144 clockwise, as indicated by arrow O.

Figure 5B:
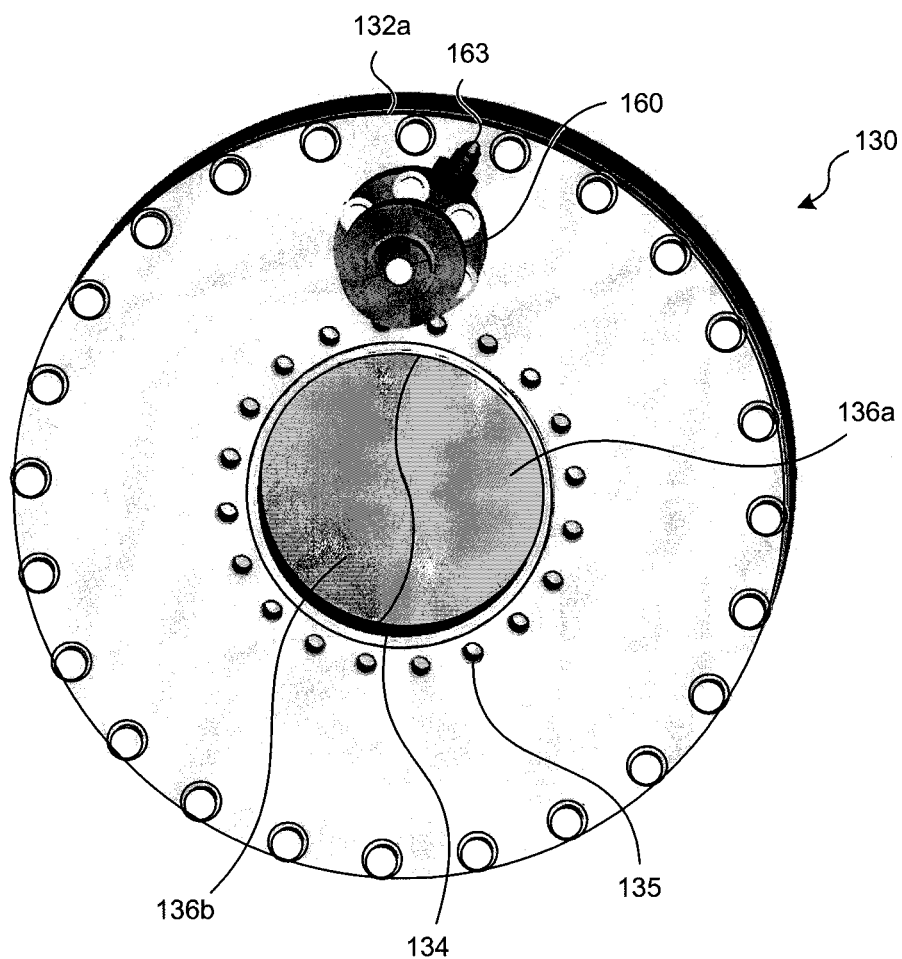

FIG. 5B is an end view of the first housing unit 132a, with the lids 136a, 136b in the closed position to prevent or significantly restrict the flow of gas through the valve aperture 134. The drive housing 160, which transmits rotary motion from a drive motor to the ring gear (FIG. 4B), includes a vent 163 to allow hot gases to escape from the valve 130, as will be discussed in greater detail later with reference to FIG. 7.

Figure 6A:
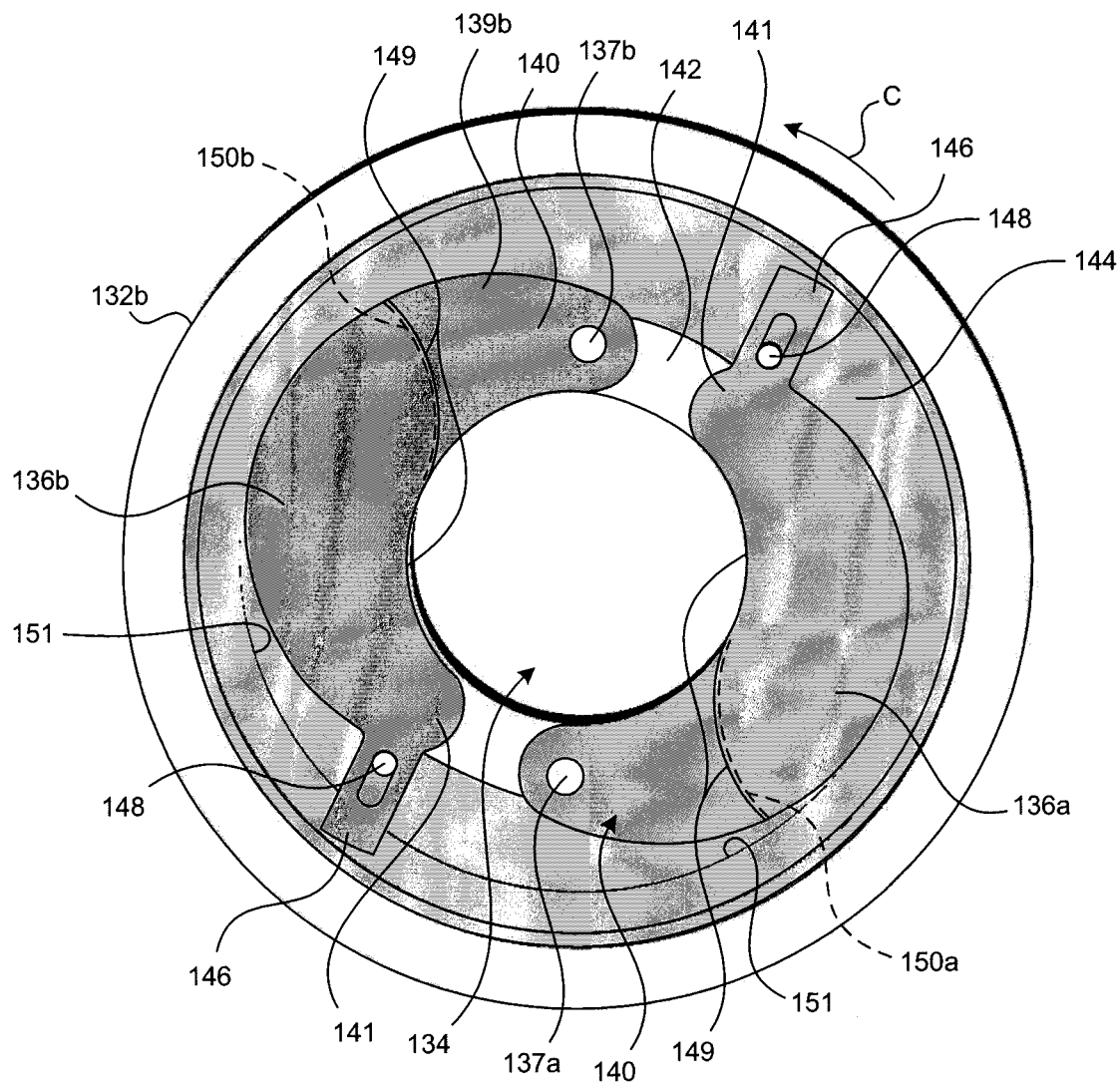
FIGS. 6A and 6B illustrate the second housing unit and the first housing unit, respectively, with the valve shown in an open configuration in accordance with an embodiment of the disclosure.

FIG. 6A is a partially schematic illustration of the second housing unit 132b, with the lids 136a, 136b in the fully open position. In this position, the close stop surfaces 149 of each of the lids are separated to expose the valve aperture 134. Each of the lids 136a, 136b bears against an open stop surface 151 carried by the drive ring 144. Accordingly, the open stop surface 151 prevents the lids 136a, 136b from moving radially outwardly beyond the position necessary to fully open the valve aperture 134. As is also shown in FIG. 6A, the protrusions 141 and tabs 146 of each lid 136a, 136b have moved outwardly and out of the corresponding gap 140 of the other lid as the lids pivot about the respective pivot pins 137b. To close the valve 130, the drive ring 144 rotates counterclockwise as indicated by arrow C.

Figure 6B:
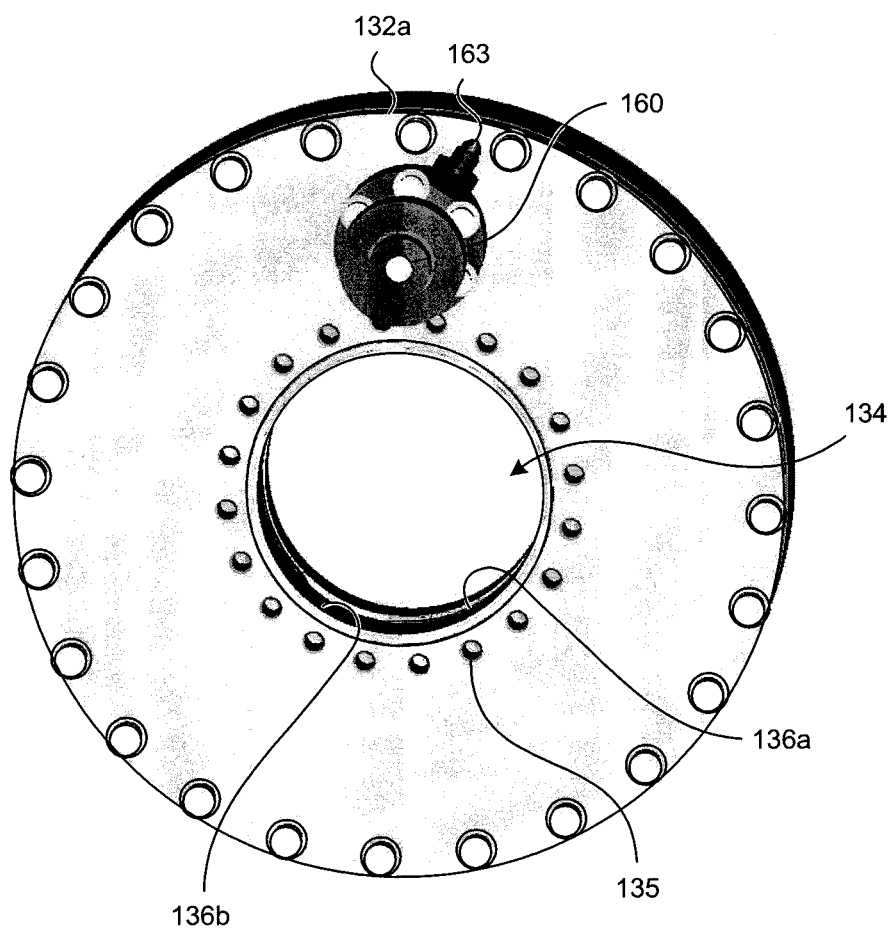

FIG. 6B is an end view of the first housing unit 132a, with the first and second lids 136a, 136b retracted so as to leave the valve aperture 134 completely open. The first and second lids 136a, 136b can be driven to any intermediate position between the open position shown in FIGS. 6A-6B and the closed position shown in FIGS. 4A-5B to regulate the amount of hot gas passing through the valve 130.

Figure 7:
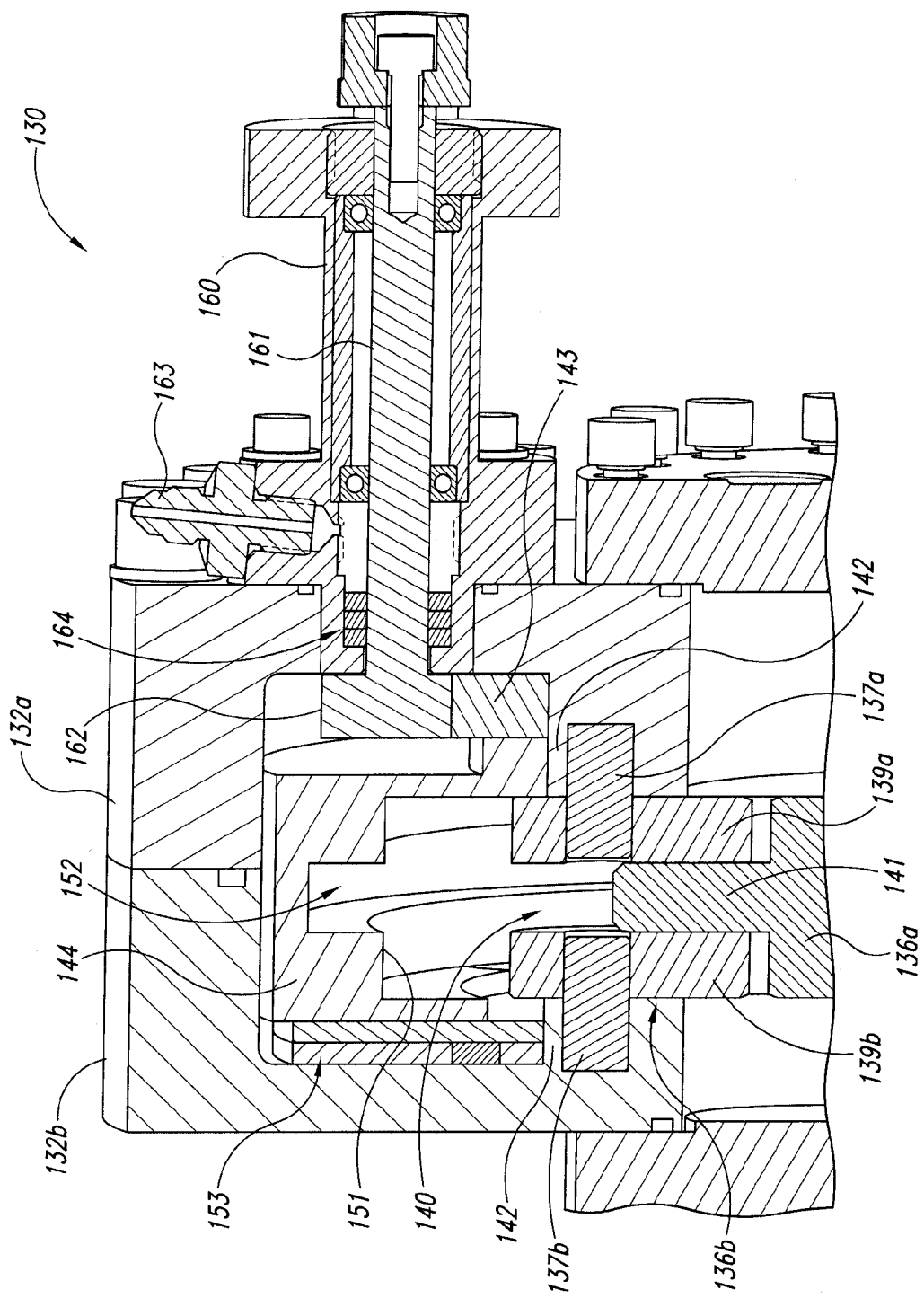
FIG. 7 is a partially schematic, cross-sectional side view taken substantially along line 7-7 of FIG. 4A, illustrating several internal components of a control valve in accordance with an embodiment of the disclosure.

FIG. 7 is a partially schematic, cut-away view of an embodiment of the valve 130, taken substantially along line 7-7 of FIG. 4A. As shown in FIG. 7, the valve 130 can include only a single hot gas seal 164 disposed between surfaces that move relative to each other. In particular, the hot gas seal 164 can be positioned between the fixed first housing unit 132a and the rotating drive shaft 161. In a particular embodiment, the hot gas seal 164 includes one or more annular graphite rings, and in other embodiments, the seal 164 can include other suitable high temperature materials. In any of these embodiments, the vent 163 can provide an escape route for hot gases that may pass through the hot gas seal 164, in a manner that shields other components of the drive housing 160 and associated motor (not shown in FIG. 7), from the high temperature gases. An advantage of this arrangement is that, compared to at least some existing valves, it reduces the number of and/or surface areas of the interfaces between fixed components and moving components across which a pressure differential develops. As a result, it is expected the embodiments of the valve 130 will suffer less wear and have a longer life expectancy, thus reducing the cost of owning and maintaining the valve and the equipment (e.g., a rocket engine) in which it is installed. Interfaces that are not exposed to large pressure differentials (e.g., interfaces between the protrusions 141 and flanges 139) are less likely to wear quickly and accordingly do not require seals, in at least some embodiments.

FIG. 7 further illustrates the ring gear 143 and the connection between the ring gear 143 and the drive ring 144. The valve 130 includes a thrust bearing 153 to support the drive ring 144 as it rotates within the housing 131. The drive ring 144 includes a tab slot 152 that extends radially outwardly from the open stop surface 151 to receive the tabs 146 (FIG. 6A) of the lids 136a, 136b. FIG. 7 also illustrates the pedestals 142 extending axially inwardly to receive the pivot pins 137a, 137b connected to the respective flanges 139a, 139b of the second lid 136b. As discussed above, a similar arrangement is used to provide the pivot connection for the first lid 136a.

One feature of at least some of the foregoing embodiments is that the lids 136a, 136b are supported at both ends: at one end via the flanges 139a, 139b and associated pivot pins 137a, 137b, and at the other via the protrusion 141. In addition, the flanges 139a, 139b of each lid 136 can "sandwich" and therefore support the protrusion 141 of the other lid. An expected advantage of this arrangement is that the lids 136a, 136b will be less likely to fail than are the cantilevered leaves of a conventional iris-type valve or shutter arrangement. An associated advantage is that the valve 130 includes only two lids in at least one embodiment. Accordingly, the number of components that are directly exposed to the high temperature, high pressure gas passing through the valve 130 is reduced when compared with a conventional iris-type arrangement.

Still another advantage of at least some of the foregoing features is that the valve 130 can operate at high speed and with high resolution. For example, in at least some embodiments, it is expected that a relatively small electric motor can drive the valve 130 between the open and closed positions in approximately 50 milliseconds or less. At the same time, the gearing ratio between the pinion 162 and the ring gear 143 can allow the associated control system (e.g., a rocket motor controller) to finely tune the amount of hot gas passing through the valve 130, and therefore the rate at which the associated turbopump 120 provides fuel and oxygen to the rocket engine 111. This arrangement is also unlike conventional rocket thrust control schemes which generally reduce thrust only to about 60% of maximum thrust. By completely or nearly completely achieving a closed position, valves in accordance with the present technology can control the flow of gas passing through them in a manner that reduces engine thrust to 10-15% or less of maximum thrust. This level of control (e.g., "deep throttling") can be particularly important for thrust vectoring maneuvers, such as those carried out during a tail-down landing.

Yet another feature of the foregoing arrangement is that the opening provided by the lids 136a, 136b as they move apart from each other is centered on the central axis 154 and is expected to change size in a relatively linear manner. This arrangement improves the predictability and reproducibility of valve settings between the open and closed position. In addition, the central location of the opening, which is maintained between an initial opening position and a fully open position, improves the quality of the flow downstream of the valve 130, relative to other valving arrangements (e.g., gate valves or ball valves) that close off flow to one side of the associated conduit before closing off flow to the other side.

Still another advantage of valves incorporating the foregoing technology is that they can open and close, unlike some conventional emergency shut-off valves. When used as a turbopump control valve, the foregoing valves can close rapidly to prevent damage to the vehicle or to a particular engine, for example, if a turbine blade in the turbopump fails, or if the turbine temperature is too high. In particular instances (e.g., if the turbine temperature is too high) the valve can later reopen when the conditions change. During the shut down period, other engines can provide sufficient thrust.

From the foregoing, it will be appreciated that specific embodiments of the technology have been described herein for purposes of illustration, but that various modifications may be made without deviating from the technology. For example, in at least some embodiments, the valve can reduce the flow passing therethrough from 100% (in the open position) to 5% or less (in the closed position). Accordingly, the valve can allow some gas to pass through it even in the closed position. In other embodiments, the valve can include features that allow the lids 136a, 136b to completely seal when in the closed position. Such features can include flexible high temperature materials at the close stop surfaces 149. When such features are not needed, the valve can be manufactured without them, as discussed above, producing a robust configuration that has reduced wear and therefore reduced maintenance costs.

In particular embodiments described above, the valve 130 is used to control the flow of hot combustion products from a combustion source, such as a gas generator, to a rocket turbopump. In other embodiments, configurations generally similar to those described herein can be used in other contexts for which high reliability and/or resistance to high temperature/high pressure environments are important. In still further embodiments, valves having the foregoing features can be included in other systems. In such systems, the valves can regulate the flow of fluids other than gases (e.g., liquids).

Certain aspects of the technology described in the context of particular embodiments may be combined or eliminated in other embodiments. For example, in some embodiments, the components of the valve can be selected to operate at temperatures up to 1000° F. and pressures up to 1000 psi. In other embodiments, such materials can be eliminated in favor of other materials selected for operation under other environmental circumstances. The valves can be used in conjunction with rockets having more or fewer than five engines. Further, while advantages associated with certain embodiments of the technology have been described in the context of those embodiments, other embodiments may also exhibit such advantages, and not all embodiments need necessarily exhibit such advantages to fall within the scope of the present technology. Accordingly, the present disclosure and associated technology can encompass other embodiments not expressly shown or described herein, and the invention is not limited, except as by the appended claims.

Although certain aspects of the invention are presented below in certain claim forms, the applicant contemplates the various aspects of the invention in any number of claim forms. Accordingly, the applicant reserves the right to pursue additional claims after filing this application to pursue such additional claim forms, in either this application or in a continuing application.

The invention claimed is:
1. A rocket valve system, comprising:
a housing having a valve aperture;
a first valve lid positioned in the housing and movable relative to the valve aperture between a closed position and an open position;
a second valve lid positioned in the housing and movable relative to the valve aperture between a closed position and an open position, wherein each valve lid includes a protrusion toward a first end and a gap toward a second end, wherein the protrusion of the first valve lid is movably supported in the gap of the second valve lid and movably receives a first drive pin, and wherein the protrusion of the second valve lid is movably supported in the gap of the first valve lid and movably receives a second drive pin; and
an actuator operably coupled to the first and second valve lids, wherein operation of the actuator in a first direction pivots the first and second valve lids toward their open positions to open the valve aperture, and wherein operation of the actuator in a second direction opposite the first direction pivots the first and second valve lids toward their closed positions to close the valve aperture.

2. A rocket valve system, comprising:
a housing having a valve aperture;
a first valve lid positioned in the housing and movable relative to the valve aperture between a closed position and an open position;
a second valve lid positioned in the housing and movable relative to the valve aperture between a closed position and an open position, wherein the first valve lid includes a first close stop surface and the second valve lid includes a second close stop surface, and wherein the first close stop surface defines a first S curve and the second close stop surface defines a complimentary second S curve that mates with the first S curve when the first and second valve lids are in their closed positions; and
an actuator operably coupled to the first and second valve lids, wherein operation of the actuator in a first direction pivots the first and second valve lids toward their open positions to open the valve aperture, and wherein operation of the actuator in a second direction opposite the first direction pivots the first and second valve lids toward their closed positions to close the valve aperture, wherein the first and second valve lids are the only valve lids in the housing, and wherein the first and second valve lids are selected to operate at pressures up to 1000 psi.

3. The valve system of claim 1 wherein the first valve lid includes a first close stop surface and the second valve lid includes a second close stop surface, and wherein the first and second close stop surfaces mate with each other when the first and second valve lids are in their closed positions.

4. The valve system of claim 3 wherein the first close stop surface defines a first curved surface and the second close stop surface defines a complimentary second curved surface that fits against the first curved surface when the first and second valve lids are in their closed positions.

5. The valve system of claim 3 wherein the first close stop surface defines a first S curve and the second close stop surface defines a complimentary second S curve that mates with the first S curve when the first and second valve lids are in their closed positions.

6. The valve system of claim 1, further comprising:
a first pivot pin pivotally connecting the first valve lid to the housing; and
a second pivot pin pivotally connecting the second valve lid to the housing, wherein operation of the actuator in a first direction pivots the first and second valve lids about the first and second pivot pins, respectively, toward their open positions to open the valve aperture, and wherein operation of the actuator in a second direction opposite the first direction pivots the first and second valve lids about the first and second pivot pins, respectively, toward their closed positions to close the valve aperture.

7. A rocket valve system, comprising:

a housing having a valve aperture;

a first valve lid positioned in the housing and movable relative to the valve aperture between a closed position and an open position, wherein the first valve lid has a first upstream surface and a first downstream surface, defined by a first flange and a second flange, respectively, and a first gap between the first upstream surface and the first downstream surface;

a second valve lid positioned in the housing and movable relative to the valve aperture between a closed position and an open position, wherein the second valve lid has a second upstream surface and a second downstream surface, defined by a third flange and a fourth flange, respectively, and a second gap between the second upstream surface and the second downstream surface, wherein a first protrusion of the first valve lid is movably received in the second gap of the second valve lid, and wherein a second protrusion of the second valve lid is movably received in the first gap of the first valve lid; and an actuator operably coupled to the first and second valve lids, wherein operation of the actuator in a first direction pivots the first and second valve lids toward their open positions to open the valve aperture, and wherein operation of the actuator in a second direction opposite the first direction pivots the first and second valve lids toward their closed positions to close the valve aperture.

8. The valve system of claim 7, further comprising:

a pair of first pivot pins, each pivotally connecting a respective one of the first or second flanges of the first valve lid to the housing; and a pair of second pivot pins, each pivotally connecting a respective one of the third or fourth flanges of the second valve lid to the housing, wherein operation of the actuator in a first direction pivots the first valve lid about the pair of first pivot pins and the second valve lid about the pair of second pivot pins toward their open positions to open the valve aperture, and wherein operation of the actuator in a second direction opposite the first direction pivots the first valve lid about the pair of first pivot pins and the second valve lid about the pair of second pivot pins toward their closed positions to close the valve aperture.

9. The valve system of claim 1, further comprising:

a drive ring rotatably received in the housing and pivotally coupled to the first and second valve lids, wherein rotation of the drive ring in a first direction pivots the first and second valve lids toward their closed positions, and rotation of the drive ring in a second direction opposite the first pivots the first and second valve lids toward their open positions.

10. The valve system of claim 7:

wherein the first protrusion includes a first slot;

wherein the second protrusion includes a second slot, and wherein the valve system further comprises a drive ring rotatably received in the housing and having a first drive pin received in the slot of the first valve lid, and a second drive pin received in the slot of the second valve lid, wherein rotation of the drive ring via the actuator in a first direction moves the first and second valve lids toward their closed positions, and wherein rotation of the drive ring via the actuator in a second direction opposite the first direction moves the first and second valve lids toward their open positions.

11. The valve system of claim 7:

wherein the housing has a first housing unit connected to a second housing unit;

wherein the first protrusion includes a radially outwardly extending first tab having a first slot;

wherein the second protrusion includes a radially outwardly extending second tab having a second slot; and wherein the valve system further comprises:

a pair of first pivot pins, each connecting one flange of the respective first and second valve lids to the first housing unit;

a pair of second pivot pins, each connecting the other flange of the respective first and second valve lids to the second housing unit;

a drive ring received in the housing and having a first drive pin received in the first slot of the first valve lid, and a second drive pin received in the second slot of the second valve lid;

a ring gear connected to the drive ring;

a pinion meshed with the ring gear, wherein the actuator is operably coupled to the pinion to rotate the drive ring via the ring gear, wherein rotation of the drive ring in a first direction moves the first and second valve lids toward their closed positions, and rotation of the drive ring in a second direction opposite the first moves the first and second valve lids toward their open positions.

12. A rocket valve system, comprising:

a housing having a valve aperture;

first and second valve elements positioned in the housing and movable relative to the valve aperture between a closed position and an open position, each valve element being pivotably connected to the housing toward a first end and supported by the other valve element toward a second end, wherein each valve element includes an upstream surface, a downstream surface, a protrusion toward the first end and a gap toward the second end, wherein the upstream surface is defined by a first flange, the downstream surface is defined by a second flange, and the gap is between the upstream surface and the downstream surface, wherein the protrusion of the first valve element is movably supported in the gap of the second valve element, and wherein the protrusion of the second valve element is movably supported in the gap of the first valve element;

and pins for pivoting the valve elements toward and away from their open and closed positions.

13. The valve system of claim 12 wherein the first valve element includes a first close stop surface and the second valve element includes a second close stop surface, wherein the first and second close stop surfaces mate with each other when the first and second valve elements are in their closed positions, and wherein the first and second close stop surfaces move toward and away from each other to provide exclusive control of the size of the valve aperture.

14. The valve system of example 12 wherein the housing includes a first housing unit connected to a second housing unit, and wherein the valve system further comprises:

a combustion source;

a first conduit connected between the combustion source and the first housing unit;

a turbopump coupled to at least one of a fuel supply and an oxidizer supply for a rocket engine, the turbopump including a gas turbine; and a second conduit connected between the gas turbine and the second housing unit, wherein the pins control the flow of fluid from the combustion source to the gas turbine by pivoting the valve elements toward and away from their open and closed positions.

15. The valve system of claim 2, further comprising:

a drive ring rotatably received in the housing and pivotally coupled to the first and second valve lids, wherein rotation of the drive ring in a first direction pivots the first and second valve lids toward their closed positions, and rotation of the drive ring in a second direction opposite the first pivots the first and second valve lids toward their open positions.

16. The valve system of claim 2, further comprising:

a first pivot pin pivotally connecting the first valve lid to the housing; and a second pivot pin pivotally connecting the second valve lid to the housing, wherein operation of the actuator in a first direction pivots the first and second valve lids about the first and second pivot pins, respectively, toward their open positions to open the valve aperture, and wherein operation of the actuator in a second direction opposite the first direction pivots the first and second valve lids about the first and second pivot pins, respectively, toward their closed positions to close the valve aperture.

* * * * *

UNITED STATES PATENT AND TRADEMARK OFFICE
CERTIFICATE OF CORRECTION

| | | |
|---|---|---|
| PATENT NO. | : 9,217,389 B1 | Page 1 of 1 |
| APPLICATION NO. | : 13/294061 | |
| DATED | : December 22, 2015 | |
| INVENTOR(S) | : Gerald A. Lee et al. | |

It is certified that error appears in the above-identified patent and that said Letters Patent is hereby corrected as shown below:

In the claims,

In column 10, line 62, in claim 14, delete "example" and insert -- claim --, therefor.

Signed and Sealed this
Fourteenth Day of June, 2016

Michelle K. Lee
*Director of the United States Patent and Trademark Office*